(12) United States Patent  (10) Patent No.: US 11,979,525 B2
Kishimoto                  (45) Date of Patent:     May 7, 2024

(54) INFORMATION PROCESSING APPARATUS AND SYSTEM AND NON-TRANSITORY COMPUTER READABLE MEDIUM

(71) Applicant: FUJIFILM Business Innovation Corp., Tokyo (JP)

(72) Inventor: Yasunari Kishimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 262 days.

(21) Appl. No.: 17/224,142

(22) Filed: Apr. 7, 2021

(65) Prior Publication Data

US 2022/0078295 A1    Mar. 10, 2022

(30) Foreign Application Priority Data

Sep. 8, 2020  (JP) ................................ 2020-150641

(51) Int. Cl.
```
H04N 1/00       (2006.01)
G06F 3/04812    (2022.01)
G06F 3/04845    (2022.01)
G06F 40/109     (2020.01)
```

(52) U.S. Cl.
CPC ..... *H04N 1/00392* (2013.01); *G06F 3/04812* (2013.01); *G06F 3/04845* (2013.01); *G06F 40/109* (2020.01); *H04N 1/00331* (2013.01); *H04N 1/0036* (2013.01)

(58) Field of Classification Search
CPC ........... H04N 1/00392; H04N 1/00331; H04N 1/0036; G06F 3/04812; G06F 3/04845; G06F 40/109

See application file for complete search history.

(56) References Cited

U.S. PATENT DOCUMENTS

| | | | | |
|---|---|---|---|---|
| 2013/0159919 | A1* | 6/2013 | Leydon ................. | G06F 40/289 715/780 |
| 2014/0019855 | A1* | 1/2014 | Kim ....................... | G06Q 10/10 715/268 |
| 2017/0004331 | A1* | 1/2017 | Weldon ............... | G06F 21/6263 |
| 2019/0087551 | A1* | 3/2019 | Sakata .................... | G06F 21/31 |

FOREIGN PATENT DOCUMENTS

| | | | | |
|---|---|---|---|---|
| CN | 104794140 | A * | 7/2015 | |
| JP | H07125334 | | 5/1995 | |
| JP | H08118731 | | 5/1996 | |
| JP | 2002183120 | | 6/2002 | |
| JP | 2002229974 | A * | 8/2002 | |
| JP | 2003085167 | | 3/2003 | |
| JP | 2008123394 | A * | 5/2008 | ........... G06F 17/214 |
| TW | 201407383 | A * | 2/2014 | |

OTHER PUBLICATIONS

"Notice of Reasons for Refusal of Japan Counterpart Application No. 2020150641", issued on Mar. 19, 2024, with English translation thereof, p. 1-p. 5.

* cited by examiner

*Primary Examiner* — Jeffery A Brier

(74) *Attorney, Agent, or Firm* — JCIPRNET

(57) ABSTRACT

An information processing apparatus includes a processor configured to make a character input into an input field invisible, the input field being displayed on a display, and to display a character image on the display so that the character image is superimposed on the character input into the input field, the character image being drawn with an external font installed in an external apparatus based on the character input into the input field.

5 Claims, 3 Drawing Sheets

INFORMATION PROCESSING APPARATUS AND SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-150641 filed Sep. 8, 2020.

BACKGROUND

(i) Technical Field

The present disclosure relates to an information processing apparatus, an information processing system, and a non-transitory computer readable medium.

(ii) Related Art

A technology is known for drawing a character input into a terminal apparatus, such as a personal computer (PC), with an external font installed in an external apparatus, such as a server, and displaying a character image representing the drawn character on the terminal apparatus.

Japanese Unexamined Patent Application Publication No. H08-118731 discloses the following printer. The width of a character string drawn with a first font and that of a character string drawn with a second font, which replaces the character string drawn with the first font, are calculated. The distance by which each character forming the character string drawn with the second font will be shifted is calculated from the calculated widths. Then, each character forming the character string drawn with the second font is shifted in accordance with the calculated distance.

Japanese Unexamined Patent Application Publication No. 2002-183120 discloses the following print system. A document is created with a PC. This document is obtained by the PC, together with font information, which is appended to the document, indicating a font of characters used for creating the document. Editing is performed by adding characters to the document based on the font information, and then, the edited document is printed with a network printer.

SUMMARY

On a display of a terminal apparatus, an input field and an output field may be displayed separately, and a character input into the input field may be displayed in the input field with a font installed in the terminal apparatus, while a character image drawn with an external font may be displayed in the output field. In this case, a user inputting characters has to view both of the input field and the output field to compare the characters input in the input field and the character image drawn with the external font in the output field with each other. Additionally, the input field and the output field are displayed in a reduced size so that both of them can be displayed together in a limited area of the display. Alternatively, the input field and the output field may be switched and alternately displayed. In this case, however, the user is required to perform a switching operation and is unable to view the input field and the output field at the same time on the display.

Aspects of non-limiting embodiments of the present disclosure relate to an information processing apparatus and system and a non-transitory computer readable medium that can assist a user in inputting a character in the information processing apparatus and in viewing a character image, which is drawn with an external font installed in an external apparatus based on the input character, when the character image is displayed in the information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to make a character input into an input field invisible, the input field being displayed on a display, and to display a character image on the display so that the character image is superimposed on the character input into the input field, the character image being drawn with an external font installed in an external apparatus based on the character input into the input field.

BRIEF DESCRIPTION OF THE DRAWINGS

An exemplary embodiment of the present disclosure will be described in detail based on the following figures, wherein.

DETAILED DESCRIPTION

Figure 1:
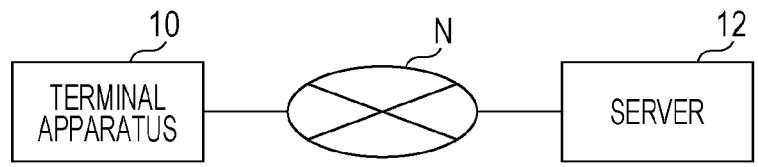
FIG. 1 is a block diagram illustrating an example of the configuration of an information processing system according to the exemplary embodiment.

An information processing system according to the exemplary embodiment will be described below with reference to FIG. 1. FIG. 1 illustrates an example of the configuration of the information processing system according to the exemplary embodiment. The information processing system includes a terminal apparatus 10 and a server 12, for example. The server 12 and the terminal apparatus 10 can each communicate with other apparatuses via a communication network N. The communication network N is the Internet, a local area network (LAN), or another network. Plural terminal apparatuses 10 and plural servers 12 may be included in the information processing system.

The terminal apparatus 10 is an example of an information processing apparatus and is a personal computer (PC), a tablet PC, a smartphone, or a cellular phone, for example. Font data is stored in the terminal apparatus 10 and characters are displayed by using a font installed in the terminal apparatus 10. Hereinafter, a font in the terminal apparatus 10 will be called a terminal font.

The server 12 is an example of an external apparatus. Font data is stored in the server 12. Hereinafter, a font in the server 12 will be called a server font. The server font is an example of an external font. The server 12 draws a character by using a server font. That is, the server 12 forms a character into vector data (rendering data) or image data so as to generate a character image, such as image data or vector data, representing the character expressed by the server font. When forming a character into vector data, the server 12 may form the vector data as an animated image.

In the information processing system according to the exemplary embodiment, information concerning a character to be drawn is sent from the terminal apparatus 10 to the server 12. The server 12 draws the character with a server font so as to generate a character image representing the character. Data on the character image is sent to the terminal apparatus 10 and the character image is displayed on the display of the terminal apparatus 10.

Server fonts are high-quality fonts which are not installed in the terminal apparatus 10, such as decorative fonts and special fonts that are not installed in general PCs, for example, fonts which are not licensed to be installed in the terminal apparatus 10, and fonts which are not realistic to be installed in the terminal apparatus 10 from an economical point of view (expensive fonts, for example). With the use of such server fonts, characters can be displayed on the terminal apparatus 10 in a display format that is not achieved by fonts installed in the terminal apparatus 10.

It is now assumed that a product, such as a pamphlet, a flyer, or a poster, is created in the terminal apparatus 10. By using a server font, a high-quality product can be produced, which would not be created with a font installed in the terminal apparatus 10.

Figure 2:
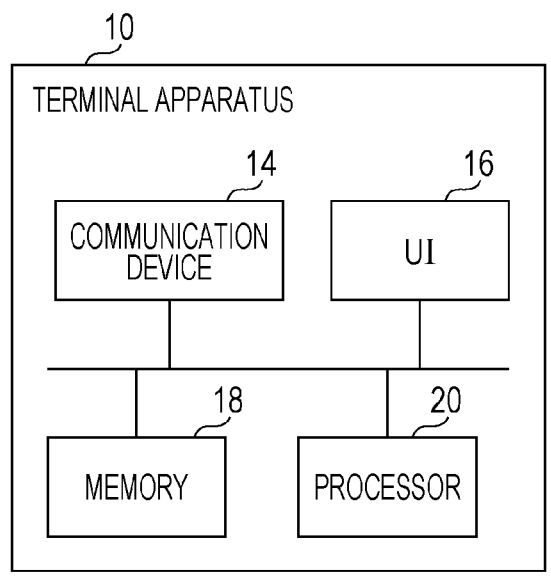
FIG. 2 is a block diagram illustrating an example of the configuration of a terminal apparatus.

The configuration of the terminal apparatus 10 will be discussed below with reference to FIG. 2. FIG. 2 illustrates an example of the configuration of the terminal apparatus 10.

The terminal apparatus 10 includes a communication device 14, a user interface (UI) 16, a memory 18, and a processor 20, for example.

The communication device 14 is a communication interface having a communication chip and a communication circuit, for example, and has a function of sending information to another device and a function of receiving information from another device. Communication performed by the communication device 14 may be wireless communication or wired communication.

The UI 16 includes a display and an operation unit. The display is a liquid crystal display or an electroluminescence (EL) display, for example. The operation unit is a keyboard, input keys, a mouse, or an operation panel, for example. The UI 16 may be a touchscreen which serves both as the display and the operation unit.

The memory 18 is a device having one or multiple storage regions for storing various types of information. The memory 18 is a hard disk drive (HDD), various memory units (such as a random access memory (RAM), a dynamic random access memory (DRAM), and a read only memory (ROM)), another type of storage device (such as an optical disc), or a combination thereof. The memory 18 included in the terminal apparatus 10 is constituted by one or plural memory devices. Data on the terminal fonts is stored in the memory 18.

The processor 20 controls the operations of the individual elements of the terminal apparatus 10. The processor 20 may include a memory. The processor 20 is an example of a first processor.

For example, the processor 20 displays an input field for inputting a character therein on the display of the terminal apparatus 10. The processor 20 makes a character input into the input field invisible. The processor 20 displays a character image, which is drawn with a server font based on the character input into the input field, on the display such that the character image is superimposed on the character input into the input field. The font used for inputting the character into the input field is a terminal font. The processor 20 makes a character image, which represents the character input into the input field and drawn with a terminal font, invisible in the input field while displaying a character image drawn with a server font in the input field.

This will be explained more specifically. The processor 20 sends information concerning a character input into the input field to the server 12. This character is a character to be drawn by the server 12. The information concerning the character to be drawn includes character identification information for identifying the character (character code, for example), font identification information for identifying a font used for drawing the character (font name, for example), and size information indicating the size of the character. The information concerning the character may also include information indicating the color of the character. The font used for drawing the character is a server font. The server font may be specified by a user or be determined in advance. As described below, the server 12 generates a character image by drawing the character with a server font based on information concerning the character. Data indicating this character image is sent from the server 12 to the terminal apparatus 10. The processor 20 receives this data sent from the server 12 and displays the character image in the input field.

Making a character invisible is making this character transparent, displaying this character by minimizing the size of the character, displaying this character by adjusting the color of the character to a background color, or deleting data of the character input into the input field. That is, making a character invisible is making the character not viewable by a user or making it difficult for a user to view the character when the character is displayed on a display.

The configuration of a character represented by a character image drawn with a server font and that with a terminal font are different from each other, and the two characters may overlap each other when they are displayed. Such an overlapping state is also encompassed in the concept that characters are displayed in a superimposed manner.

For example, the processor 20 superimposes characters on each other by using image layers. The processor 20 performs the superimposition of characters in the following manner, for example. An input layer and a display layer are set. The same size of an input field is formed in each of the input layer and the display layer. The processor 20 superimposes the input layer and the display layer on each other so that the respective input fields match each other. The processor 20 receives a character input into the input layer, makes the character in the input layer invisible, and then displays a character image, which is drawn with a server font based on the character input into the input layer, in the input field of the display layer.

The processor 20 may execute the above-described processing when creating a product. For example, the processor 20 displays a template of a product on the display of the terminal apparatus 10. The template includes one or plural images and one or plural input fields for inputting characters therein. As a result of a user inputting characters into the individual input fields, a product is created. A character image drawn with a server font is displayed in each input field. For example, when editing or previewing the product, a character image drawn with a server font is displayed in each input field. A product created with such character images may be printed.

Figure 3:
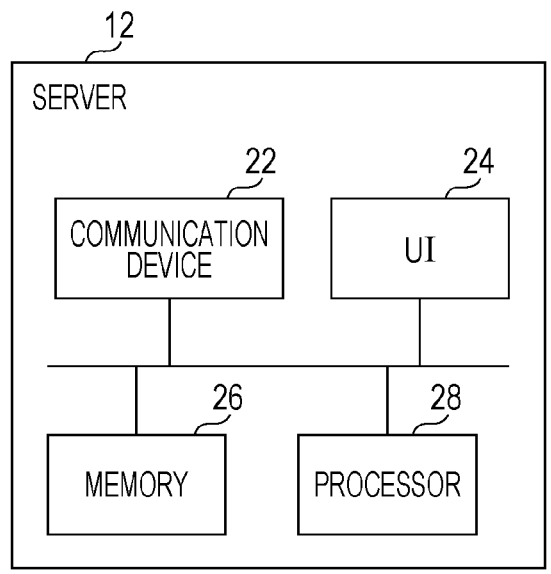
FIG. 3 is a block diagram illustrating an example of the configuration of a server.

The configuration of the server 12 will be discussed below with reference to FIG. 3. FIG. 3 illustrates an example of the configuration of the server 12.

The server 12 includes a communication device 22, a UI 24, a memory 26, and a processor 28, for example.

The communication device 22 is a communication interface having a communication chip and a communication circuit, for example, and has a function of sending information to another device and a function of receiving information from another device. Communication performed by the communication device 22 may be wireless communication or wired communication.

The UI 24 includes a display and an operation unit. The display is a liquid crystal display or an EL display, for example. The operation unit is a keyboard, input keys, a mouse, or an operation panel, for example. The UI 24 may be a touchscreen which serves both as the display and the operation unit.

The memory 26 is a device having one or multiple storage regions for storing various types of information. The memory 26 is an HDD, various memory units (such as a RAM, a DRAM, and a ROM), another type of storage device (such as an optical disc), or a combination thereof. The memory 26 included in the server 12 is constituted by one or plural memory devices. Data on server fonts is stored in the memory 26.

The processor 28 controls the operations of the individual elements of the server 12. The processor 28 may include a memory. The processor 28 is an example of a second processor.

The processor 28 generates a character image by drawing a character with a server font.

Processing executed by the processor 28 will be described below in detail. The processor 28 of the server 12 receives from the terminal apparatus 10 information concerning a character to be drawn, that is, information concerning a character input into the input field in the terminal apparatus 10. As discussed above, information concerning the character to be drawn includes character identification information for identifying the character (character code, for example), font identification information for identifying a font used for drawing the character (font name, for example), and size information indicating the size of the character. The processor 28 identifies the character to be drawn from the character code indicated by the information concerning the character and draws the identified character by using the font indicated by the font identification information, that is, a server font, thereby generating a character image representing the character expressed by the server font. The character represented by the character image generated by the processor 28 is formed in the size indicated by the size information. The processor 28 then sends data indicating the generated character image to the terminal apparatus 10. In the terminal apparatus 10, the character image is displayed in the input field. If color information indicating the color of the character is included in the information concerning the character, the character represented by the character image generated by the processor 28 may be expressed in the color indicated by the color information.

The information processing system according to the exemplary embodiment will be described below in detail through illustration of a specific example.

Figure 4:
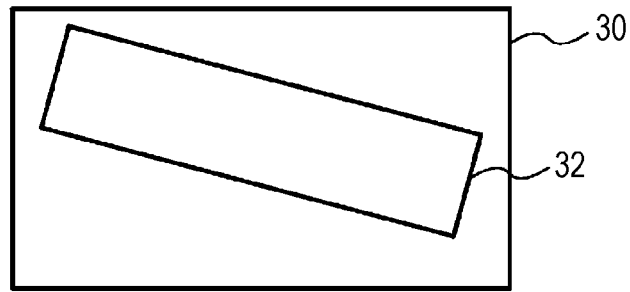
FIG. 4 illustrates a screen in the exemplary embodiment.

FIG. 4 illustrates a screen 30, which is an example of the screen displayed on the display of the terminal apparatus 10. An input field 32 for inputting characters therein is displayed on the screen 30. For example, when creating a product, such as a pamphlet, in response to a user giving an instruction to display a template of the product by operating the terminal apparatus 10, the processor 20 of the terminal apparatus 10 displays the template on the screen 30. The input field 32 is formed in the template and is displayed on the screen 30. Creating a product by using a template is only an example, and the input field 32 may be displayed for another purpose.

In response to the user performing an operation for inputting a character into the input field 32 by using the terminal apparatus 10, the character is input into the input field 32. It is assumed that the character "あ" is input as an example.

The user specifies a server font to be used and the size of the character by using the terminal apparatus 10 and inputs the character into the input field 32. The processor 20 of the terminal apparatus 10 obtains from the server 12 font identification information for identifying each of fonts installed in the server 12 and causes the display of the terminal apparatus 10 to display a list of the server fonts. The user selects a desired server font from the list. The server font to be used may be determined in advance. It is assumed that the user has selected the server font "α".

In response to the user inputting the character "あ" into the input field 32, the processor 20 of the terminal apparatus 10 sends information concerning the input character "あ" to the server 12. The character "あ" is a character to be drawn by the server 12. Information concerning the character "あ" includes character code for identifying the server font 45 "あ", font identification information for identifying the server font "α" (font name "α", for example) to be used for drawing the character "あ", and size information indicating the size of the character "あ". The information concerning the character "あ" may include color information indicating the color of the character "あ".

The processor 28 of the server 12 receives the information concerning the character "あ" from the terminal apparatus 10. The processor 28 identifies the character "あ" to be drawn from the character code, the server font "α" used for drawing the character "あ" from the font identification information, and the size of the character "あ" from the size information.

The processor 28 then draws the character "あ" with the server font "α" so as to generate a character image representing the character "あ" expressed by the server font "α". The character image representing the character "あ" generated by the processor 28 is formed in the size indicated by the size information.

The processor 28 then sends data indicating the character image representing the character "あ" expressed by the server font "α" to the terminal apparatus 10.

The processor 20 of the terminal apparatus 10 receives this data from the server 12 and displays the character image represented by the data in the input field 32. At this time, the processor 20 makes a character image representing the character "あ" drawn by a font (font "β", for example) installed in the terminal apparatus 10 invisible in the input field 32. The processor 20 makes the character "あ" expressed by the font "β" transparent, for example.

Figure 5:
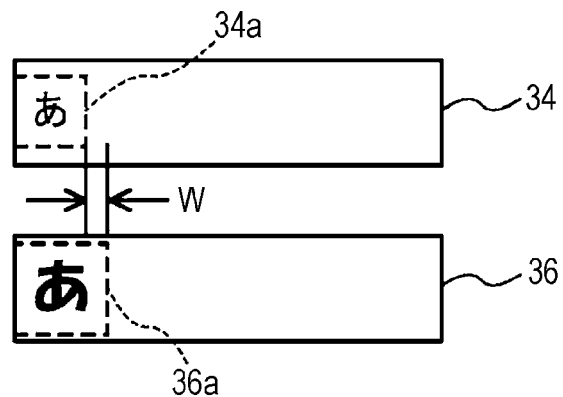
FIG. 5 illustrates an input field formed in a layer.
Figure 6:
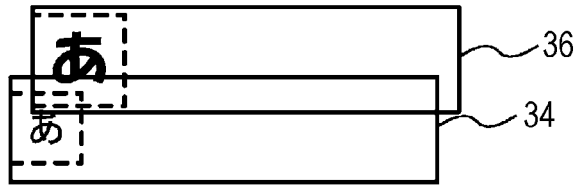
FIG. 6 illustrates the superimposition of layers.

The processor 20 superimposes characters by using image layers, for example. Processing to be executed by using layers will be discussed below with reference to FIGS. 5 and 6. Input fields 34 and 36 formed in the layers are shown in FIGS. 5 and 6. The input field 34 is formed in the input layer, while the input field 36 is formed in the display layer. The input fields 34 and 36 have the same shape and size as those of the input field 32 displayed on the screen 30 and are located at the same position as the input field 32 on the screen 30. The input field 36 formed in the display layer may be used as the input field 32 displayed on the screen 30. The input field 34 formed in the input layer is not displayed on the screen 30. Any character input into the input field 34 is made invisible.

The processor 20 superimposes the input layer and the display layer on each other so that the input field 34 formed in the input layer and the input field 36 formed in the display layer are disposed at the same position.

In response to the user inputting the character "あ" into the input field by operating the terminal apparatus 10, the processor 20 receives input of the character "あ" as input into the input field 34 of the input layer. The processor 20 draws the character "あ" with the terminal font "β" installed in the terminal apparatus 10 so as to generate a character image representing the character "あ" expressed by the terminal font "β" and then makes the character image invisible. The processor 20 may store data on the character input into the input layer in the memory 18 or delete the data after the character is input into the input layer.

In response to the user inputting the character "あ" into the input field 34 of the input layer, the processor 20 sends information concerning the character "あ" to be drawn to the server 12, as stated above. The processor 28 of the server 12 draws the character "あ" with the server font "α" so as to generate a character image representing the character "あ" expressed by the server font "α". Data on the character image is sent from the server 12 to the terminal apparatus 10.

Upon receiving this data from the server 12, the processor 20 of the terminal apparatus 10 displays the character image in the input field 36 of the display layer.

A character image 34a shown in FIG. 5 is an image representing the character "あ" expressed by the terminal font "β", for example. The character image 34a is disposed within the input field 34 of the input layer.

A character image 36a shown in FIG. 5 is an image representing the character "あ" expressed by the server font "α", for example. The character image 36a is disposed within the input field 36 of the display layer.

The processor 20 superimposes the input layer and the display layer on each other, as shown in FIG. 6. Then, the input field 34 of the input layer and the input field 36 of the display layer are disposed at the same position. Although, for the sake of description, the input field 34 of the input layer and the input field 36 of the display layer are shown to be displaced from each other in FIG. 6, they are disposed at the same position in a superimposed manner.

Figure 7:
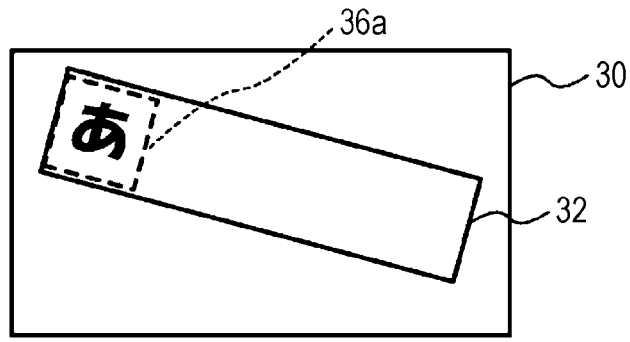
FIG. 7 illustrates a screen in the exemplary embodiment.

The processor 20 makes the character image 34a invisible while making the character image 36a visible. As a result, on the screen 30, the character image 36a is displayed in the input field 32, while the character image 34a is made invisible, as shown in FIG. 7. The character image 34a is displayed as a transparent character, for example.

When plural characters are input into the input field 32, the processor 20 of the terminal apparatus 10 may send information concerning each character one by one to the server 12. That is, every time one character is input into the input field 32, the processor 20 may send information concerning this character to the server 12. Alternatively, every time plural characters, such as a predetermined number of characters, are input into the input field 32, the processor 20 may send information concerning these characters to the server 12. When information concerning each character is sent from the terminal apparatus 10 one by one, the processor 28 of the server 12 draws characters one by one so as to generate character images, each representing one character, one by one. When information concerning plural characters is sent from the terminal apparatus 10, the processor 28 may draw characters one by one so as to generate character images, each representing one character, one by one. The processor 28 may alternatively draw the plural characters at the same time so as to generate a character image representing these plural characters.

Figure 8:
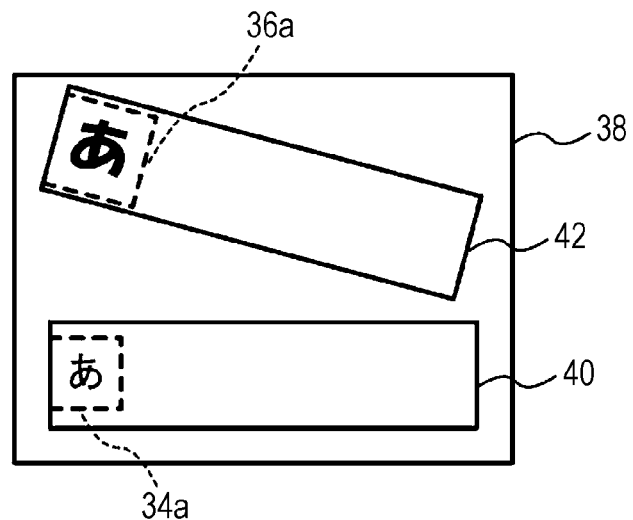
FIG. 8 illustrates a screen in a comparative example.

A comparative example will be described below with reference to FIG. 8. FIG. 8 illustrates a screen 38 in the comparative example.

An input field 40 and a display field 42 are formed on the screen 38 in the comparative example. The input field 40 is a field into which a user inputs a character. The display field 42 is a field in which a character image generated as a result of a character input into the input field 40 being drawn with a server font is displayed. The display field 42 is a field formed in a product to be created, for example.

In the input field 40, a character image 34a representing a character input by a user is displayed. In the comparative example, the character image 34a is generated as a result of a character input by the user (character "あ", for example) being drawn with a terminal font installed in the terminal apparatus used for inputting the character by the user, and is displayed in the input field 40. In the comparative example, the character image 34a is not made invisible and is displayed in the input field 40 so as to be viewable by the user. The character in the input field 40 is displayed in black, for example.

In the display field 42, a character image 36a is displayed. The character image 36a is generated as a result of a character input into the input field 40 (character "あ", for example) being drawn with a server font and is displayed in the display field 42.

In the comparative example, the character image 34a represented by a terminal font and the character image 36a represented by a server font are both displayed at different positions on the screen 38. In such a display mode, a user has to view both of the input field 40 and the display field 42 so as to compare them with each other. In contrast, in the display mode in the exemplary embodiment, a user has no need to compare an input field and a display field. Additionally, in the comparative example, it is necessary to secure a region for displaying both of the input field 40 and the display field 42 on the screen 38. In the exemplary embodiment, such a region is not required.

A cursor displayed in the input field 32 in the exemplary embodiment will be discussed below. A cursor is an image indicating the position at which the next character is input into the input field 32.

In the exemplary embodiment, since a terminal font and a server font are different fonts, the configuration of the character "あ" representing the character image 34a expressed by the terminal font and that of the character image 36a expressed by the server font are different from each other. Hence, when the input layer and the display layer are superimposed on each other, the character "あ" represented by the character image 34a and that by the character image 36a do not perfectly match each other. For example, as shown in FIG. 5, the width of the character image 34a and that of the character image 36a are different from each other by a width W. That is, a difference is generated between the position of a character input into the input layer and that in the display layer. Even if the same size of a character is specified for a terminal font and a server font, the configuration of the character expressed by the terminal font and that by the server font are different from each other since the two fonts are different font types. The size of the character expressed by the terminal font and that by the server font thus become different.

Figure 9:
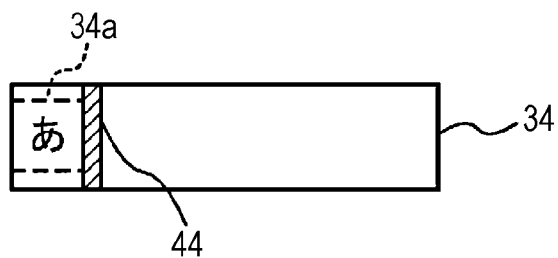
FIG. 9 illustrates an input field formed in a layer.

Because of such a difference in the width, when a cursor 44 is displayed based on the display position of the character image 34a, it deviates from a correct position by the width W, as shown in FIG. 9. The cursor 44 thus overlaps the character image 36a or is too separated from the character image 36a, thereby failing to indicate the correct position at which the next character is input.

In the exemplary embodiment, to display a cursor at a more accurate position, the processor 20 of the terminal apparatus 10 displays the cursor 44 indicating the position at which the next character is input in the input field 32, based on the display position of the character image 36a displayed in the input field 32. The processor 28 of the server 12 calculates the display position of the cursor 44 in the input field 34, based on the size of the character image 36a. This will be explained more specifically. The processor 28 calculates the display position of the cursor 44 based on the size, position, and character-to-character distance of the character image 36a and the direction in which input characters are arranged (hereinafter called the input direction). Examples of the input direction are a vertically written direction and a horizontally written direction. For example, the processor 28 determines the position which is located in the input direction and is adjacent to the character image 36a as the display position of the cursor 44. The processor 28 then sends information indicating the calculated display position to the terminal apparatus 10. The processor 20 of the terminal apparatus 10 displays the cursor 44 within the input field 32 based on the calculated display position.

Figure 10:
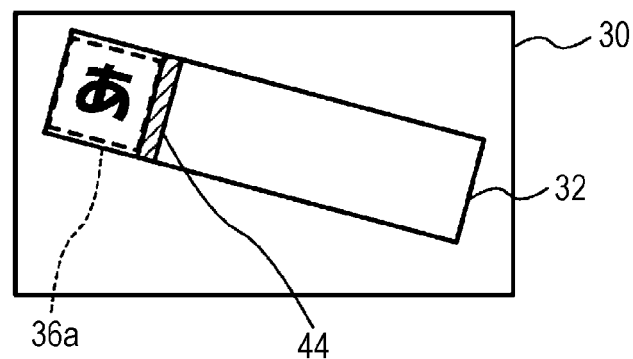
FIG. 10 illustrates a screen in the exemplary embodiment.

FIG. 10 illustrates the cursor 44 displayed at the display position calculated as described above. In the example shown in FIG. 10, the input direction is the horizontally written direction, and the cursor 44 is displayed at the position which is located in the input direction and is adjacent to the character image 36a in the input field 32. As a result of calculating the display position of the cursor 44 based on the character image 36a and displaying the cursor 44 at the calculated display position, the position at which the next character is input is specified more accurately.

When the next character is input after the character image 36a, it is drawn with a server font so that a character image representing this character is generated and displayed next to the character image 36a. Then, the display position of the cursor 44 is calculated by the server 12 and the cursor 44 is displayed next to the character image representing this next character.

Likewise, when a character is deleted or a new line is started, the processor 28 of the server 12 calculates the display position of the cursor 44 based on the deleted character or the new line, and the processor 20 of the terminal apparatus 10 displays the cursor 44 at the calculated display position. If a line breaking rule is applied, the processor 28 of the server 12 calculates the display position of the cursor 44 in accordance with this rule. For example, if a rule that punctuation marks and question marks should not be disposed at the start of a sentence is set, the processor 28 calculates the display positions of punctuation marks, question marks, and the cursor 44 in accordance with this rule. Additionally, if multiple characters displayed in the input field are selected by a user, the processor 28 of the server 12 may calculate a range of the selected characters and the processor 20 of the terminal apparatus 10 may display the calculated range in a specific color, such as gray.

The processor 20 of the terminal apparatus 10 may display a dummy character or a dummy symbol (such as a symbol representing the shape of a square) between the character image 34a and the display position of the cursor 44 in the input layer and display the cursor 44 next to the dummy character or the dummy symbol.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
display an input field on a display, wherein the input field comprises an input layer and a display layer superimposed on the input layer,
receive a character input into the input field,
receive a character image from the external apparatus, wherein the character image comprises the character input into the input field and being drawn with an external font, and wherein the external font is installed in the external apparatus and not installed in the information processing apparatus,
display the character input into the input field on the input layer of the input field based on a local font, and
display the character image on the display layer of the input field that is superimposed on the input layer.

2. The information processing apparatus according to claim 1, wherein the processor is further configured to display a cursor in the input field, based on a display position of the character image drawn with the external font in the input field, the cursor indicating a position at which a character is subsequently input in the input field.

3. An information processing system comprising:
an information processing apparatus including a first processor; and
an external apparatus including a second processor,
the first processor being configured to
display an input field on a display, wherein the input field comprises an input layer and a display layer superimposed on the input layer,
receive a character input into the input field,
send information concerning the character input into the input field to the external apparatus, the second processor being configured to generate a character image by drawing the character input into the input field with an external font installed in the external apparatus and not installed in the information processing apparatus, based on the information concerning the character, and send the character image to the information processing apparatus, the first processor being further configured to display the character input into the input field on the input layer of the input field based on a local font, and display the character image on the display layer of the input field that is superimposed on the input layer.

4. The information processing system according to claim 3, wherein:

the second processor is further configured to calculate a display position of a cursor in the input field based on a size of the character image, the cursor indicating a position at which a character is subsequently input in the input field, and send information indicating the calculated display position of the cursor to the information processing apparatus; and the first processor is further configured to display the cursor in the input field based on the calculated display position.

5. A non-transitory computer readable medium storing a program causing a computer to execute a process, the process comprising:

displaying an input field on a display, wherein the input field comprises an input layer and a display layer superimposed on the input layer;

receiving a character input into the input field;

receiving a character image from the external apparatus, wherein the character image comprises the character input into the input field and being drawn with an external font, and wherein the external font is installed in the external apparatus and not provided in the information processing apparatus;

displaying the character input into the input field on the input layer of the input field based on a local font; and displaying the character image on the display layer of the input field that is superimposed on the input layer.

* * * * *